Oct. 26, 1926.
E. L. HARRINGTON
CLAM SHELL BUCKET
Filed Sept. 25, 1924
1,604,284
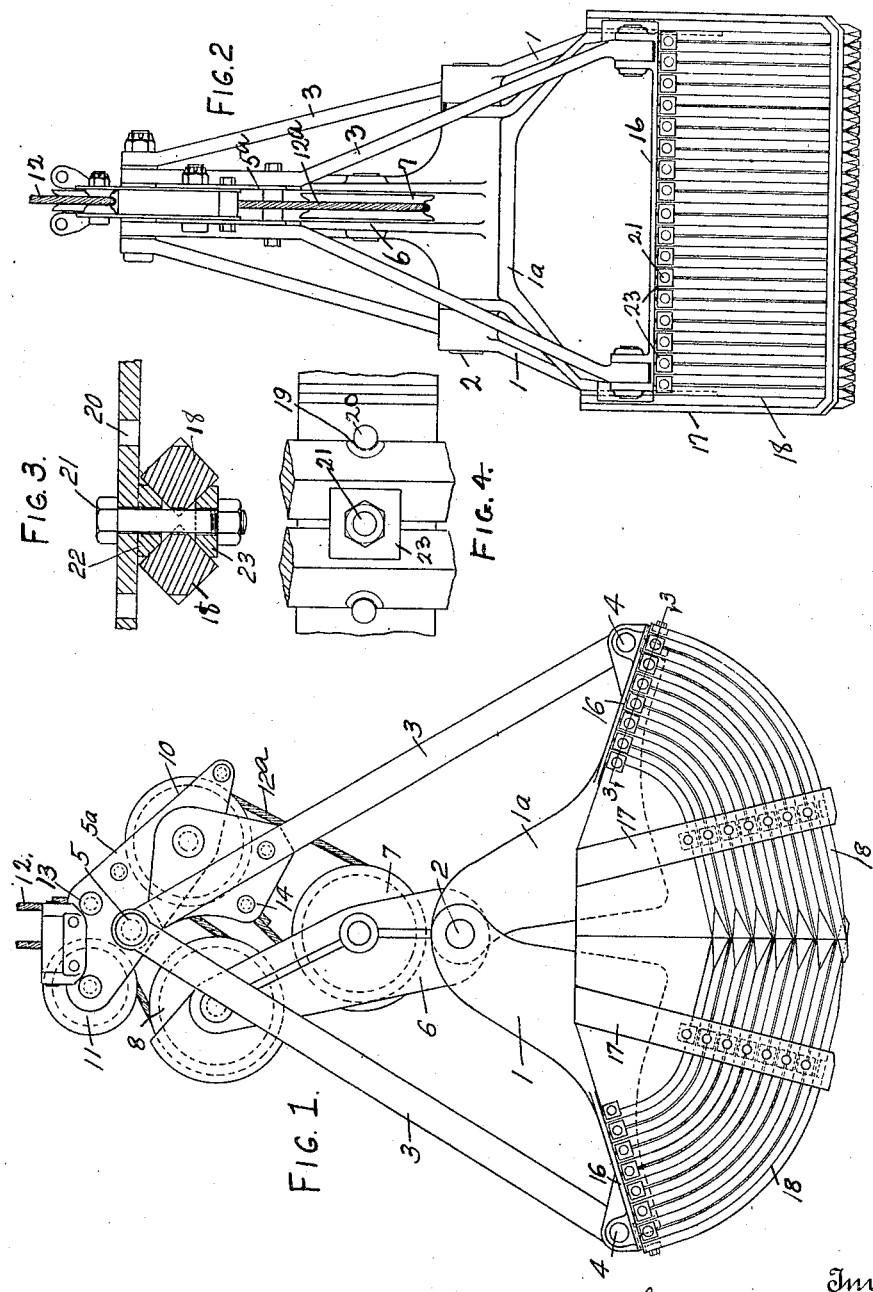

Patented Oct. 26, 1926.

1,604,284

UNITED STATES PATENT OFFICE.

EDWARD L. HARRINGTON, OF ERIE, PENNSYLVANIA, ASSIGNOR TO G. H. WILLIAMS COMPANY, OF ERIE, PENNSYLVANIA, A CORPORATION OF PENNSYLVANIA.

CLAMSHELL BUCKET.

Application filed September 25, 1924. Serial No. 739,941.

This invention is designed to improve clam shell buckets particularly of the type using tines for the scoop members. I have improved the tines and means of holding them using tines of rectangular cross section preferably square and clamping these with the diagonal of the cross section perpendicular to the frames with which they are secured. Features of the invention will appear from the specification and claims.

The invention is illustrated in the accompanying drawings as follows:—

Fig. 1 shows a side elevation of the clam shell.

Fig. 2 an end elevation of the same.

Fig. 3 an enlarged section of the tines on the line 3—3 in Fig. 1.

Fig. 4 an enlarged face view of the means for securing the tines.

The frames having the closing levers 1 and 1ª are pivotally connected by a pin 2. Corner bars 3 are pivotally secured to the frames by pins 4 and extend to a pin 5 on the head 5ª. A closing lever 6 extends from the frame 1ª and sheaves 7 and 8 are pivotally mounted in the closing lever 6 and sheaves 10 and 11 are journaled in the head 5ª. A lifting cable 12 is secured at 13 and a closing cable 12ª extends around the sheaves 11, 8, 10 and 7 and is secured on the head at 14. These parts are not the subject of this invention. The frame has the bows 16 and 17. Tines 18 of rectangular cross section and bent to form the scoop are arranged outside of the bow 16 and inside of the bow 17. These tines are preferably pointed at their meeting ends.

The tines have half round notches 19 formed in their edges. These notches are formed by swaging so that the mass of metal at the notches is not reduced. Holes 20 are formed in the frames in register with the notches 19 when the tines are in place. Bolts 21 extend through the openings 20 and the notches 19. Bevelled clamping plates 22 and 23 are arranged at each side of the tines and on the bolt 21, the bevelled plate 22 being so proportioned as to receive the side faces of the tines. As the bolt 21 is drawn up the tines are clamped with a wedge engagement of the plates 22 and 23 thus making a very desirable connection. In addition to the clamping effect of the plates the bolts extending through the notches key the tines in place. The same fastening device is arranged for securing the tines on both bows 16 and 17, the only difference being that the bolts are reversed.

What I claim as new is:—

1. In a clam shell bucket, the combination of connected frames; tines having rectangular cross sections with diagonals perpendicular to the frames at the point of engagement with the frames; and means securing the tines to the frames comprising bolts extending through the frames and between the tines and individual clamping plates through which the bolts extend.

2. In a clam shell bucket, the combination of connected frames; tines having rectangular cross sections with diagonals perpendicular to the frames at the point of engagement with the frames; and means securing the tines to the frames comprising bolts extending through the frames and between the tines and individual bevelled clamping plates engaging the tines through which the bolts extend.

3. In a clam shell bucket, the combination of connected frames; tines having rectangular cross sections with diagonals perpendicular to the frames at the point of engagement with the frames; and means securing the tines to the frames comprising bolts extending through the frames and between the tines, said tines having notches in their sides through which the bolts extend, forming keys for the tines, the space between the tines being less than the diameter of the bolts and the notches in the tines forming openings through which the bolts may pass.

4. In a clam shell bucket, the combination of connected frames; tines having rectangular cross sections with diagonals perpendicular to the frames at the point of engagement with the frames; and means securing the tines to the frames comprising bolts extending through the frames and between the tines, said tines having notches in their sides with undiminished mass at the notches through which the bolts extend keying the tines in place.

5. In a clam shell bucket, the combination of connected frames; tines having rectangular cross sections with diagonals perpendicular to the frames at the point of engagement with the frames; and means securing the tines to the frames comprising bolts extending through the frames and between the tines, said tines having notches in their sides into which the bolts extend keying the tines and clamping plates engaging the tines through which the bolts extend, the tines being spaced a less distance apart than the diameter of the bolts, the notches in the tines forming openings for the bolts.

In testimony whereof I have hereunto set my hand.

EDWARD L. HARRINGTON.